J. C. LISTON.
MARKER ATTACHMENT FOR CORN PLANTERS.
APPLICATION FILED FEB. 13, 1908.
901,541. Patented Oct. 20, 1908.
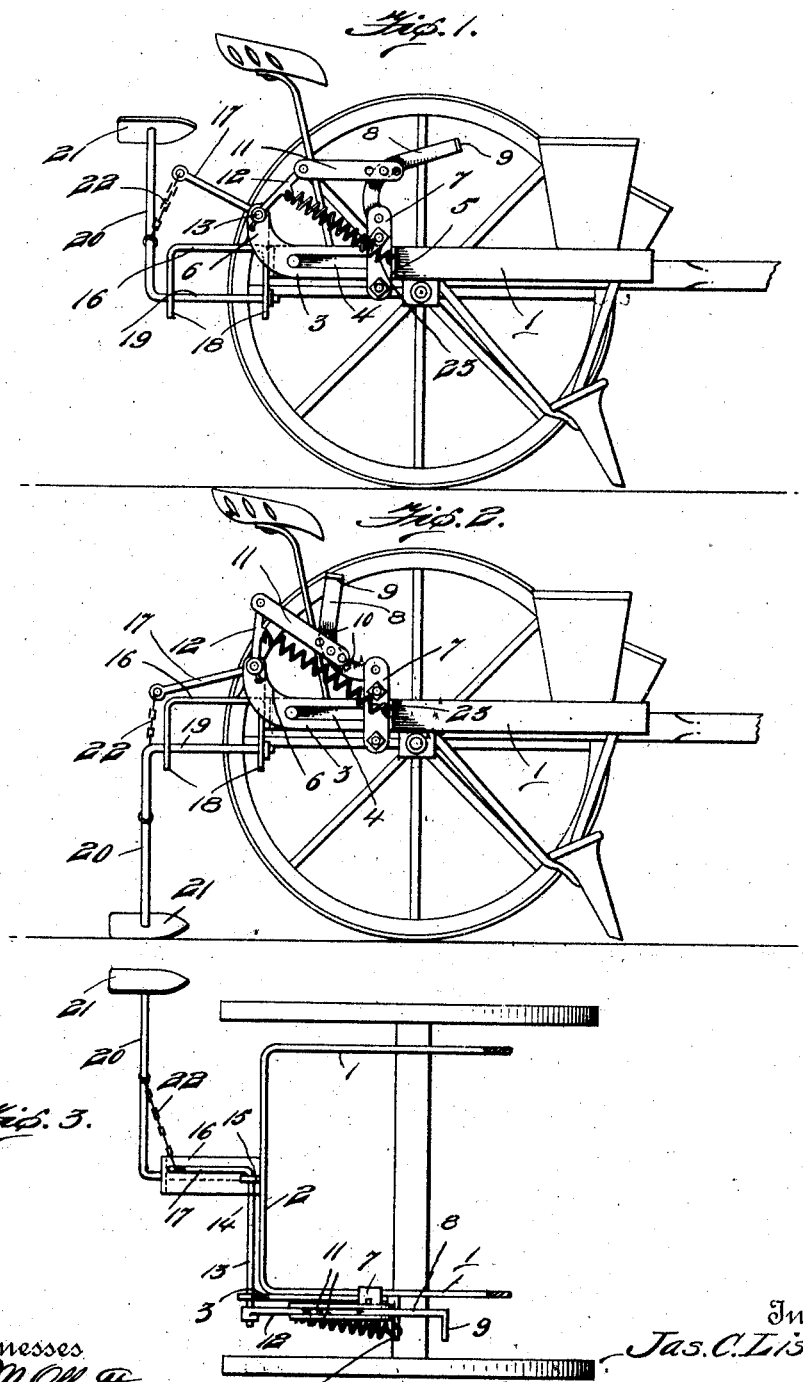

UNITED STATES PATENT OFFICE.

JAMES C. LISTON, OF CHATSWORTH, ILLINOIS.

MARKER ATTACHMENT FOR CORN-PLANTERS.

No. 901,541.     Specification of Letters Patent.     Patented Oct. 20, 1908.

Application filed February 13, 1908. Serial No. 415,708.

*To all whom it may concern:*

Be it known that I, JAMES C. LISTON, a citizen of the United States, residing at Chatsworth, in the county of Livingston and State of Illinois, have invented certain new and useful Improvements in Marker Attachments for Corn-Planters; and I do declare the following to be a full, clear, and exact description of the invention, such as will enable others skilled in the art to which it appertains to make and use the same.

This invention relates to new and useful improvements in farming implements and more especially to marker attachments for corn planters.

The main object of the invention resides in the provision of means for retaining the marker proper in either elevated or inoperative position or in lowered or marking position.

A further object of the invention is to provide means for shifting the marker proper from elevated into lowered or marking position without necessitating that the operator move from the seat on the planter frame.

A still further object of the invention is to greatly improve and simplify the structure shown in my patented devices Nos. 821,178 and 831,961, patented May 22, '06 and Sept. 25, '06, respectively.

In the accompanying drawings: Figure 1 is a view in side elevation illustrating the application of the invention to a corn planter of any approved construction, the marker proper being elevated or in an inoperative position. Fig. 2 is a similar view with the marker proper in lowered or in marking position. Fig. 3 is a plan view of Fig. 2 with some parts broken away.

Referring to the drawing, the invention is represented or shown attached to a corn planter of any approved construction, the frame of the planter consisting of side bars 1 and a rearwardly spaced cross bar 2. An adjustable supporting bar 3 which has formed in its body portion a longitudinally extending slot 4 is adjustably attached to one of the side pieces or bars of the planter frame, the forward end of the supporting bar 3 being bent laterally to form an outstanding ear 5 and the rear end of the bar terminating in an upwardly extending apertured end portion 6.

Vertical clamping members 7 are arranged, one to bear against the inner face of the side piece of the frame adjacent to the adjustable supporting bar 3 and the other to bear against the outer face of said adjustable bar, said clamping members serving to hold the supporting bar 3 in an adjusted position to the adjacent side piece of the planter frame. An operating lever 8 is terminally pivoted at its lower end between the upper ends of the clamping members 7, the body of the lever being preferably of forwardly curved formation and the forward terminal or inner end of the same being bent laterally to form an outstanding extension 9. Said lever is also provided in the central portion of its body with a series of spaced apertures 10 to either one of which may be connected the forward ends of connecting links or bars 11, the rear ends of which are connected with an operating arm 12 keyed to the body portion 13 of a rocker member 14, said body portion extending through the apertured end portion 6 of the adjustable supporting bar 3 and through a vertically disposed apertured ear 15 formed at the upper end of a hanger member 16 attached to the cross piece 2 of the planter frame. The inner end of the body portion of the rocker member 14 is bent rearwardly approximately at right angles to form a rearwardly extending arm 17. The hanger member 16 is formed at its lower end with two laterally spaced longitudinally alining apertured depending portions 18 designed to receive the forwardly bent terminal portion 19 of the marker proper, the body 20 of which extends in a lateral direction with respect to the planter frame and is provided with the usual marking blade 21. A flexible connecting element 22 is arranged between the rear end of said arm 17 and the inner end of the body 20 of the marker proper, the purpose of which will be evident.

A resilient connecting element preferably in the form of a coil spring 23 is terminally attached or connected to the operating arm 12 and to the outstanding ear 5 of the adjustable side bar 3, the tendency of the spring being to normally exert a pull on the operating arm to maintain the marker proper in an elevated or inoperative position. To shift the marker proper into a lowered or marking position, the operator pulls rearwardly on the forward end of the operating lever 8 which operation rocks the rocker member 14 in its bearings and in doing so lowers the arm 17 of the latter sufficiently to permit the marker proper to descend until in engagement with the ground. During this operation the connecting links are shifted from approximately a horizontal position to a pronounced inclined position as clearly indicated in Fig. 2, while the operating arm 12 is shifted from a forwardly inclined position to an approximately vertical position, under which conditions the pull exerted on the operating arm by the coil spring 25 is exerted at an angle approximately corresponding with the angular position of the connecting links or bars 11, retaining said links in said last mentioned position. To shift the marker proper from a lowered or marking position into an elevated position, the operator pushes forwardly on the operating lever 8, the spring 23 being of sufficient strength to return the marking lever, connecting links, and other coöperating elements employed to shift the marker proper into operative position, after the foot lever has been sufficiently shifted to cause the lifting pull exerted upon the foot lever at the point of its connection with the connecting links, to more than counteract the force tending to retain the lever in lowered position.

From the foregoing description taken in connection with the drawings, the construction and operation of the invention will be understood without requiring a more extended explanation.

I claim as my invention:—

1. In combination with a planter frame of approximately U-shaped form, a supporting bar formed with a longitudinal slot in its body portion adjustably attached to one side piece of the frame, the forward end of said bar being formed with an outstanding ear and the opposite end bent in a vertical plane, a hanger member attached to the cross piece of the frame, a laterally movable marker proper supported by the hanger member, a rocker member comprising forwardly and rearwardly extending end portions mounted between the upper end of the hanger member and the rear end of the adjustable supporting bar, a flexible connection between the rearwardly extending arm of the rocker member and the marker proper, an operating lever pivoted above the side piece of the planter frame adjacent to the adjustable supporting bar, horizontal connecting links arranged between the forwardly extending end portion of the rocker member and the body of the operating lever respectively, and an obliquely disposed pull spring arranged between the forwardly extending arm of the rocker member and the ear of the adjustable supporting bar.

2. A marker attachment for planters comprising a laterally movable marker mounted on the planter frame, a pull spring for normally holding the marker in an elevated or inoperative position, and connections under the control of the operator operable to shift the marker into a lowered or operative position and at the same time to relieve the marker of the pull normally exerted thereon by said spring.

3. A marking attachment for corn planters comprising a laterally movable marker mounted in the planter frame, a rocker member comprising a rearwardly extending arm mounted at the rear of the frame, a flexible connection between the rocker member arm and marker, a pull spring arranged between the rocker member and planter frame to normally hold the marker in an inoperative or elevated position and means under the control of the operator operable to shift the marker into a lowered or operative position and at the same time to relieve the same of the pull normally exerted thereon by the spring.

4. In combination with a planter frame having a rear cross piece, an approximately U-shaped rearwardly extending hanger member attached to the cross piece of the frame with its arms spaced longitudinally, a laterally movable marker formed with a forwardly extending portion to extend through the arms of the hanger member, a pull spring for normally supporting the marker in an elevated or inoperative position and means under control of the operator operable to shift the marker into a lowered or operative position against the tension of said spring and at the same time to relieve the marker of the pull normally exerted thereon by the spring.

5. The combination with a planter frame, of a longitudinally adjustable supporting bar connected with one of the side pieces of the frame, a rocker member comprising forwardly and rearwardly extending end portions mounted on the frame and supporting bar, a connection between the rearwardly extending arm of the rocker member and marker, an operating lever mounted upon the adjustable supporting bar, connecting links between the forwardly extending arm of the rocker member and operating lever and a pull spring between the forwardly extending arm of the rocker member and the supporting bar to hold the marker in an elevated or inoperative position.

6. In combination with a planter frame, a marker mounted in rear of the frame, a rocker member comprising forwardly and rearwardly extending end portions mounted upon the rear end of the frame, a connection between the rearwardly extending arm of the rocker member and the marker, an obliquely disposed pull spring arranged between the other arm of the rocker member and the planter frame and means under the control of the operator operable to actuate the rocker member against the tension of the spring to shift the marker into a lowered or operative position and at the same time to relieve the same of the pull normally exerted thereon by said spring, said means comprising an operating lever pivotally mounted upon the frame and connecting links between the forwardly extending arm of the rocker member and the operating lever said links extending in parallel planes and at an angle with the pull spring when the marker is in an elevated position, and adapted to shift their positions to planes substantially parallel with said spring when the marker is in a lowered or operative position.

In testimony whereof I have hereunto set my hand in presence of two subscribing witnesses.

JAMES C. LISTON.

Witnesses:
G. W. McCABE,
CHAS. F. SHAFER.